United States Patent
Muramoto et al.

(10) Patent No.: US 11,306,630 B2
(45) Date of Patent: Apr. 19, 2022

(54) ON-VEHICLE OIL SENSOR WITH MULTIPLE OIL FLOW PATHS

(71) Applicant: Yazaki Corporation, Tokyo (JP)

(72) Inventors: Daichi Muramoto, Shizuoka (JP);
Kazuyuki Matsunaga, Shizuoka (JP);
Shigeki Totsuka, Shizuoka (JP);
Hiroaki Nasuno, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 101 days.

(21) Appl. No.: 16/848,005

(22) Filed: Apr. 14, 2020

(65) Prior Publication Data
US 2020/0332685 A1  Oct. 22, 2020

(30) Foreign Application Priority Data
Apr. 16, 2019  (JP) .............................. JP2019-077544

(51) Int. Cl.
| | |
|---|---|
| *F01M 11/10* | (2006.01) |
| *G01L 19/14* | (2006.01) |
| *G01K 1/08* | (2021.01) |
| *F01P 11/18* | (2006.01) |
| *F01P 11/16* | (2006.01) |

(52) U.S. Cl.
CPC .............. *F01M 11/10* (2013.01); *F01P 11/16* (2013.01); *F01P 11/18* (2013.01); *G01K 1/08* (2013.01); *G01L 19/147* (2013.01); *F01M 2250/00* (2013.01); *F01P 2025/04* (2013.01); *F01P 2025/40* (2013.01)

(58) Field of Classification Search
CPC . F01M 11/10; F01P 11/16; F01P 11/18; F01P 2025/40
See application file for complete search history.

(56) References Cited

U.S. PATENT DOCUMENTS

| | | | |
|---|---|---|---|
| 4,217,221 A * | 8/1980 | Masso ................... | B01D 17/048 123/196 R |
| 7,284,428 B1 | 10/2007 | Hoben et al. | |
| 2003/0079546 A1* | 5/2003 | Johnson .............. | G01L 19/0645 73/716 |
| 2004/0089074 A1 | 5/2004 | Avisse | |
| 2005/0193825 A1* | 9/2005 | Otsuka ................ | G01L 19/0645 73/715 |
| 2010/0002745 A1 | 1/2010 | Stoll et al. | |
| 2015/0218983 A1* | 8/2015 | Watanabe ............. | F04C 13/005 210/130 |

(Continued)

FOREIGN PATENT DOCUMENTS

| | | |
|---|---|---|
| JP | 60-210725 A | 10/1985 |
| JP | 2004-518953 A | 6/2004 |

(Continued)

*Primary Examiner* — Eric S. McCall
(74) *Attorney, Agent, or Firm* — Sughrue Mion, PLLC

(57) ABSTRACT

An on-vehicle oil sensor includes an enclosure and a detecting unit. The enclosure includes: an enclosure inner space provided inside the enclosure and configured to allow oil to enter the enclosure inner space; and a plurality of oil paths provided in the enclosure and connecting an exterior of the enclosure to the enclosure inner space. The detecting unit is configured to detect at least one of pressure of oil in the enclosure inner space and temperature of oil in the enclosure inner space.

5 Claims, 13 Drawing Sheets

(56) References Cited

U.S. PATENT DOCUMENTS

| | | | |
|---|---|---|---|
| 2017/0114682 A1* | 4/2017 | Miyajima | F01M 1/16 |
| 2018/0031427 A1 | 2/2018 | Fujisawa et al. | |
| 2018/0058344 A1* | 3/2018 | Nishimoto | F01L 1/2405 |
| 2018/0142554 A1* | 5/2018 | Kraft | F04C 29/026 |
| 2020/0102862 A1* | 4/2020 | Karlsson | F01M 1/16 |
| 2021/0071551 A1* | 3/2021 | Ni | F01M 1/16 |

FOREIGN PATENT DOCUMENTS

| | | |
|---|---|---|
| JP | 5222295 B2 | 6/2013 |
| JP | 6358154 B2 | 7/2018 |

* cited by examiner

ON-VEHICLE OIL SENSOR WITH MULTIPLE OIL FLOW PATHS

CROSS REFERENCE TO RELATED APPLICATION

The present application is based on, and claims priority from Japanese Patent Application No. 2019-077544, filed on Apr. 16, 2019, the entire contents of which are incorporated herein by reference.

BACKGROUND

Technical Field

The present disclosure relates to an on-vehicle oil sensor, and particularly to such an oil sensor for measuring the pressure and temperature of oil.

Related Art

An oil sensor described in JP 2004-518953 A is known as the related art. The oil sensor detects the pressure of the oil entering an enclosure inner space through one oil path provided in an enclosure by a pressure detection element.

An oil sensor described in JP 5222295 B2 is also known as the related art. The oil sensor described in JP 5222295 B2 detects the pressure of the oil entering an enclosure inner space through one oil path provided in a metal enclosure by a pressure detection element.

Further, the enclosure of the oil sensor described in JP 5222295 B2 is provided with a hole different from the oil path, and a temperature sensor is installed in the hole.

A temperature sensor described in JP 6358154 B2 is also known as the related art. The temperature sensor described in JP 6358154 B2 includes a casing and a sensor unit. The casing is constituted by integrally assembling a first case, and a second case in which an introduction hole for introducing a measuring medium (for example, oil) is formed and a screw portion is formed on an outer peripheral side face. The oil enters and exits the introduction hole through an opening provided in the second case. The sensor unit is arranged in the casing and detects the temperature of the oil introduced through the opening and the introduction hole.

In temperature sensor described in JP 6358154 B2, the temperature of the oil in the passage through which the oil flows is detected by the sensor unit by screwing the screw portion of the second case to a screw portion of a member to be attached (for example, a cylinder block of an engine) having the passage through which the oil flows.

SUMMARY

In the case where the conventional oil sensor provided with only one oil path for entering oil to the enclosure, oil sensor has a difficulty in accurately measuring the pressure of the oil when the oil path is clogged.

Further, when measuring the temperature of the oil entering the enclosure inner space with such conventional oil sensor or such conventional temperature sensor, the oil sensor or the temperature sensor has a difficulty in accurately measuring the temperature of the oil when the oil path is clogged, since each of these conventional sensors is provided with only one oil path to enter oil into the enclosure inner space and the oil strays in the enclosure inner space.

Moreover, in the conventional oil sensor provided with a hole different from the oil path for installing a temperature sensor, a difficulty in machining its components and installing the temperature sensor in the hole may not be avoided, thus such conventional oil sensor has poor productivity, because the oil sensor is required to provide the obliquely long and thin holes and in the enclosure.

It is an object of the present disclosure to provide an on-vehicle oil sensor that has good productivity and can accurately measure the temperature and pressure of oil.

The on-vehicle oil sensor according to the present embodiment includes an enclosure including an enclosure inner space provided inside the enclosure and configured to allow oil to enter the enclosure inner space and a plurality of oil paths provided in the enclosure and connecting an exterior of the enclosure to the enclosure inner space; and a detecting unit for detecting at least one of pressure of oil in the enclosure inner space and temperature of oil in the enclosure inner space.

The above described configuration enables to provide an on-vehicle oil sensor that has good productivity and can accurately measure the temperature and pressure of oil.

DETAILED DESCRIPTION

Various embodiments will be described hereinafter with reference to the accompanying drawings.

An on-vehicle oil sensor 1 according to the present embodiment measures, for example, the pressure and the temperature of oil used for lubrication and cooling of an engine (motor) of an automobile or a two-wheeled vehicle, and is integrally installed in a cylinder block of the engine (not illustrated).

Figure 1:
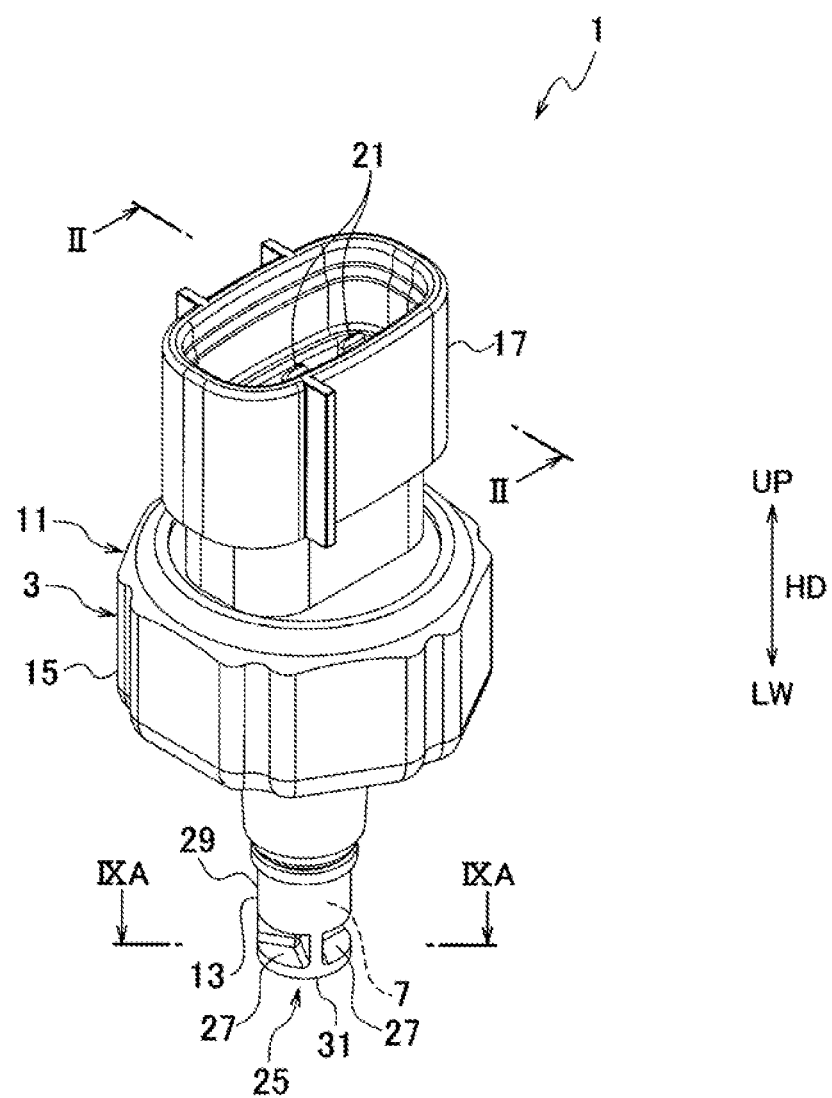
FIG. 1 is a perspective view of an on-vehicle oil sensor according to the present embodiment.
Figure 2:
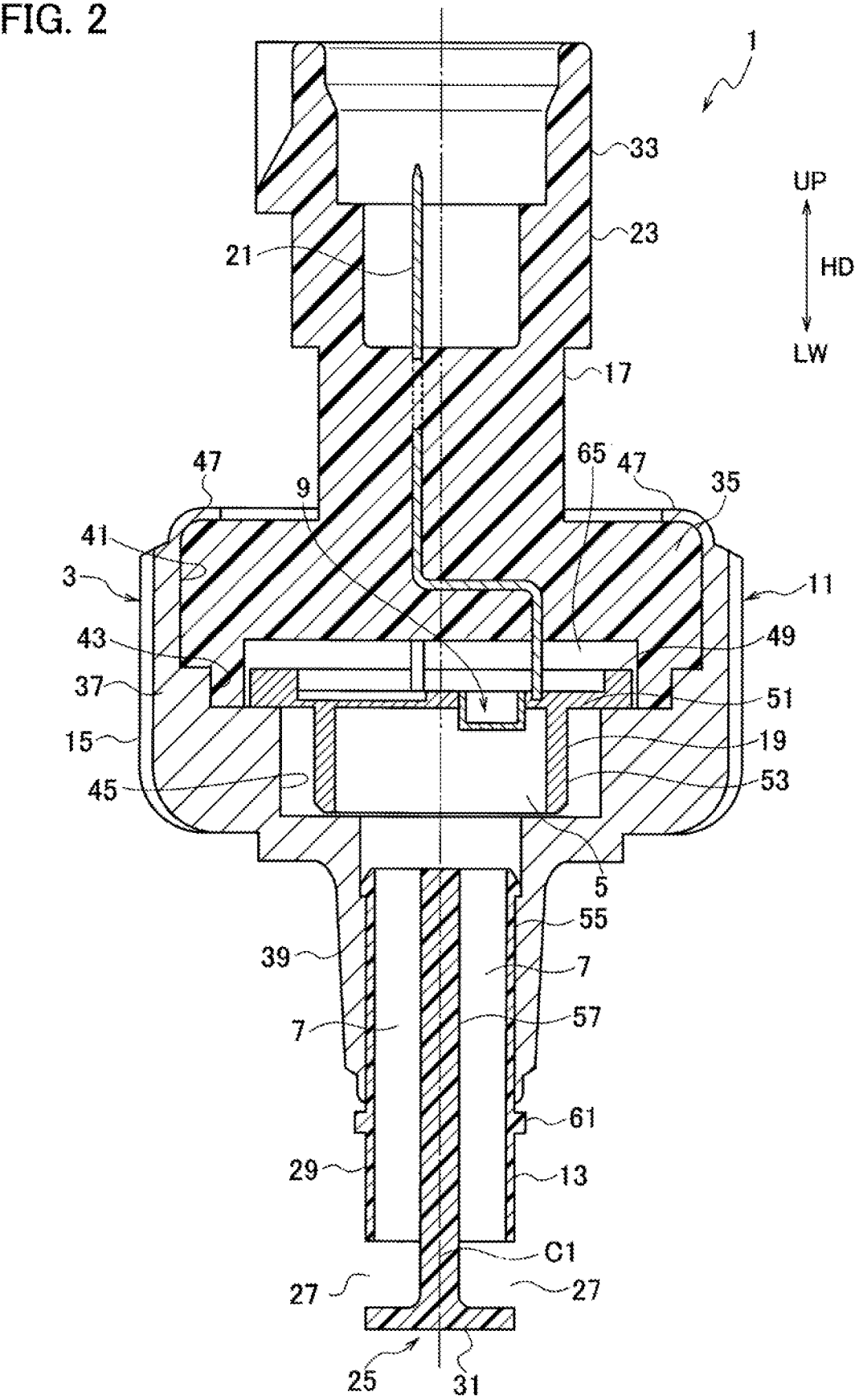
FIG. 2 is a cross-sectional view taken along the line II-II in FIG. 1.

As illustrated in FIGS. 1 and 2, the on-vehicle oil sensor 1 includes an enclosure (housing) 3, an enclosure inner space 5, an oil path (oil flow passage) 7, and a detecting unit (sensor element) 9.

The enclosure inner space 5 is provided in (inside) the enclosure 3, and oil (engine oil to be measured for pressure and temperature) enters the enclosure inner space 5.

Figure 9A:
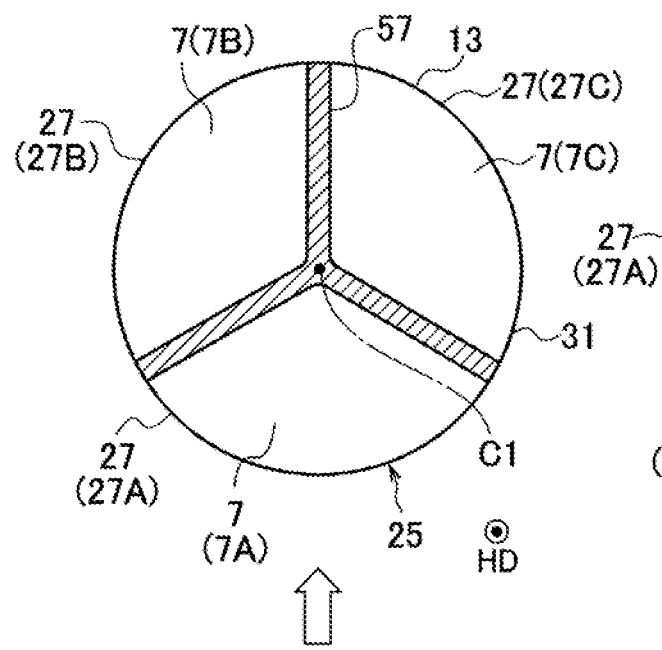
FIG. 9A is a view taken along the arrow IXA-IXA in FIG. 1, illustrating the flow direction of the oil in the oil flow passage formed in a cylinder block of an engine.
Figure 9B:
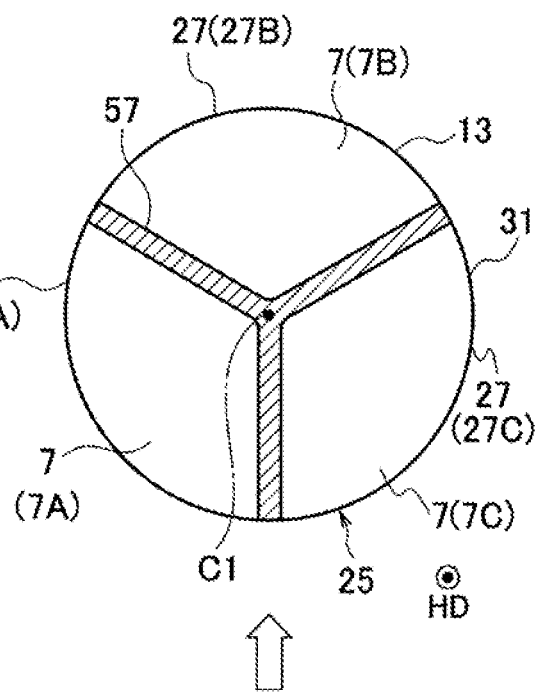
FIG. 9B is a view of the changed flow direction of the oil in the oil flow passage formed in the cylinder block of the engine in FIG. 9A.

As illustrated in, for example, FIGS. 2, 9A, and 9B, a plurality of oil paths 7 are provided in the enclosure 3, and oil flows in each of the oil paths 7 (7A, 7B, 7C). As illustrated in FIG. 2, each of the oil paths 7 (7A, 7B, 7C) connects the outside of the enclosure 3 to the enclosure inner space 5.

The plurality of oil paths 7 (7A, 7B, 7C) are provided to circulate oil in the enclosure inner space 5. Although the oil paths 7 (7A, 7B, 7C) are mutually blocked in the middle of these paths (see, for example, a partition 57 illustrated in FIG. 2), the oil paths 7 (7A, 7B, 7C) may be connected to each other at a part of these paths.

The detecting unit 9 detects at least one of the pressure of the oil entering the enclosure inner space 5 from the oil path 7 and the temperature of the oil in the enclosure inner space 5.

When an on-vehicle oil sensor 1 is installed in the engine and the engine is operating, a part of oil (see the arrow in FIG. 9A) flowing in the oil flow passage (oil path) formed in the cylinder block of the engine enters the enclosure inner space 5 through the oil path 7A of a part of the plurality of oil paths 7 provided in the enclosure 3 of the on-vehicle oil sensor 1.

In addition, the oil entering the enclosure inner space 5 passes through the other oil paths 7B and 7C among the plurality of oil paths 7 provided in the enclosure 3 of the on-vehicle oil sensor 1 and returns to the oil flow passage formed in the cylinder block of the engine. Thus, a flow of oil is generated in the enclosure inner space 5, and the oil in the enclosure inner space 5 is circulated (replaced).

The on-vehicle oil sensor 1 may be configured to measure the degree of contamination or deterioration in the oil instead of or in addition to the pressure of the oil or the temperature of the oil.

In other words, since the oil washes away burning residues such as carbon and sludge generated during combustion of engine fuel, the dirt gradually accumulates and the degree of dirt and deterioration increases. Therefore, the degree of dirt or deterioration may be detected by detecting the transparency of the oil in the enclosure inner space 5.

The transparency of the oil is determined, for example, by providing a light emitting body and a light receiving body in the enclosure inner space 5 and detecting the light transmittance of the oil in the enclosure inner space 5.

Figure 5A:
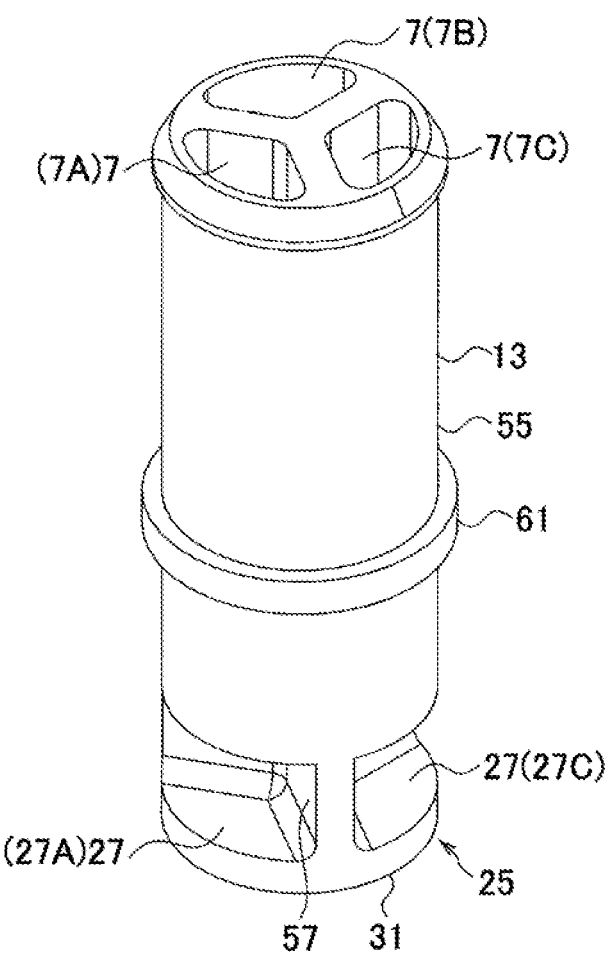
FIG. 5A is a perspective view of an oil path forming component, as viewed from the upper side UP, of the on-vehicle oil sensor according to the present embodiment.
Figure 5B:
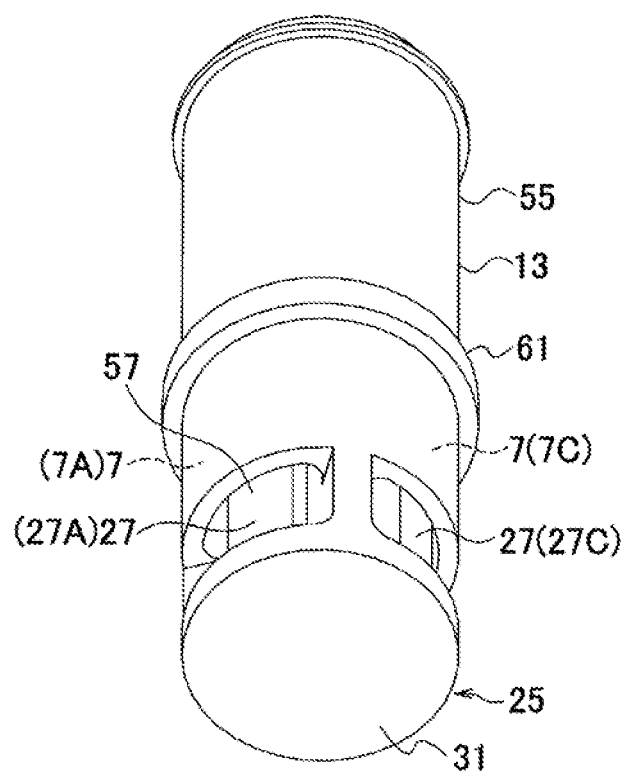
FIG. 5B is a perspective view of the oil path forming component, as viewed from the lower side LW, of the on-vehicle oil sensor according to the present embodiment.

The enclosure 3 of the on-vehicle oil sensor 1 includes an enclosure main body component 11 and an oil path forming component 13 (see FIGS. 2, 5A, and 5B). The oil path forming component 13 is formed separately from the enclosure main body component 11 and is integrally molded of resin (for example, insulating synthetic resins). The oil path forming component 13 is provided integrally in the enclosure main body component 11. The plurality of oil paths 7 (7A, 7B, 7C) are formed in the oil path forming component 13.

Figure 6A:
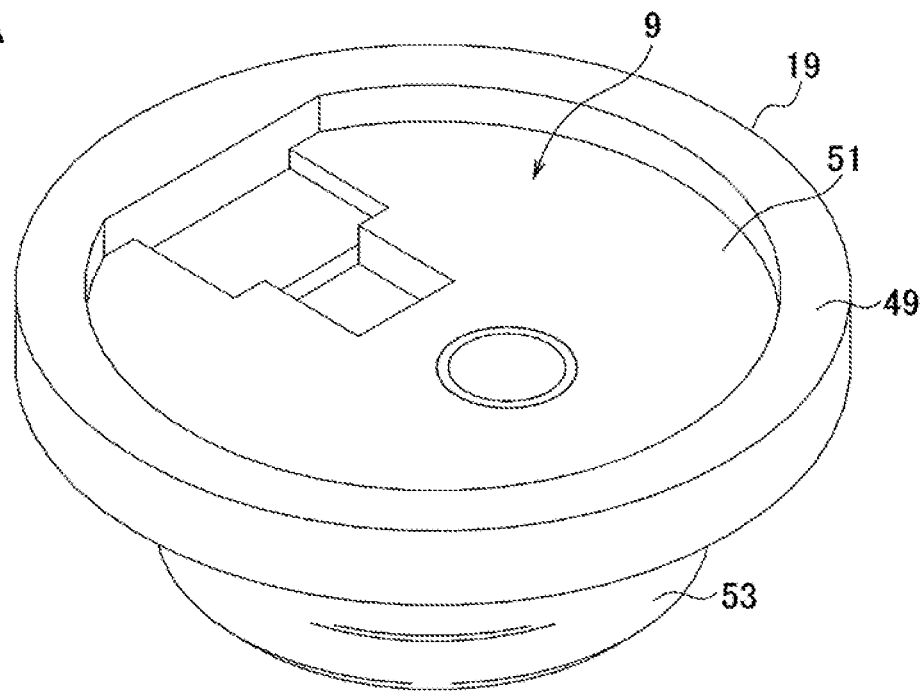
FIG. 6A is a perspective view of a detecting unit platform and a detecting unit, as viewed from the upper side UP, of the on-vehicle oil sensor according to the present embodiment.
Figure 6B:
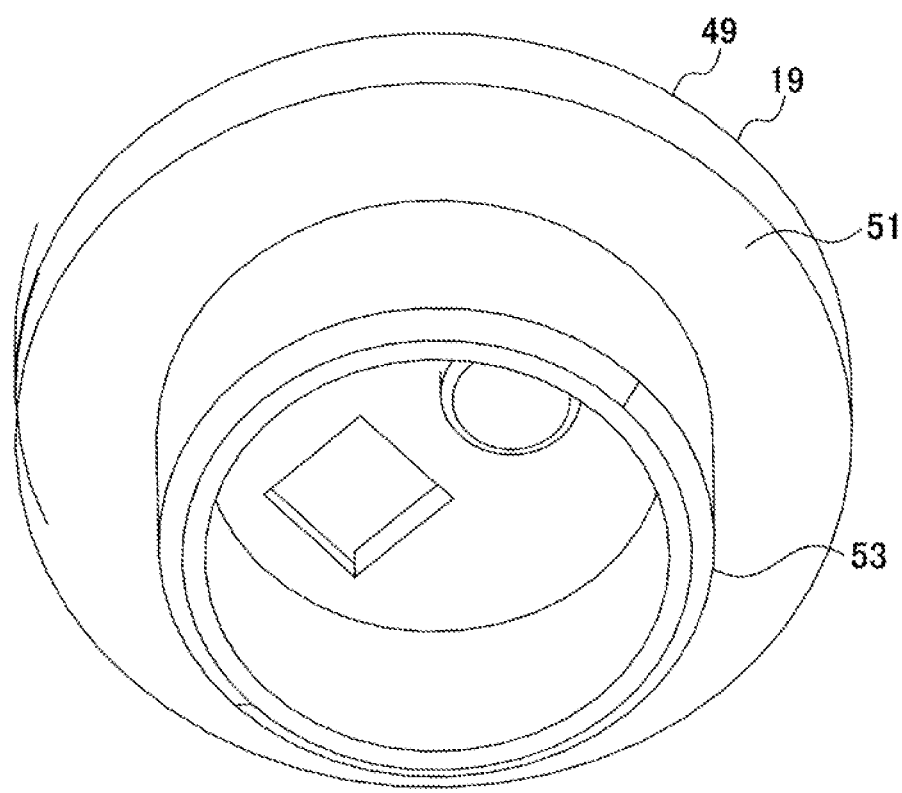
FIG. 6B is a perspective view of the detecting unit platform and the detecting unit, as viewed from the lower side LW, of the on-vehicle oil sensor according to the present embodiment.

The enclosure main body component 11 includes an enclosure main body (case) 15 (see FIGS. 2, 4A and 4B), a terminal support 17 (see FIGS. 2, 3A, and 3B), and a detecting unit platform 19 (see FIGS. 2, 6A, and 6B). The enclosure main body 15, the terminal support 17, the detecting unit platform 19, and the detecting unit 9 constituting the enclosure main body component 11 are each formed as a separate body that can be separated from each other.

The terminal support 17 is formed by insert-molding a metal terminal 21 with an insulating resin 23. The detecting unit platform 19 is formed of an insulating resin, and integrally installed with the detecting unit 9.

The enclosure main body 15 is made of metal and supports the terminal support 17 by crimping a part of the enclosure main body 15. The detecting unit 9 and the detecting unit platform 19 are installed in a space inside the enclosure main body component 11. In other words, the detecting unit 9 and the detecting unit platform 19 are installed in a space inside the enclosure 3 formed by the enclosure main body 15 and the terminal support 17. As will be described later in detail, a part of the inner space forms the enclosure inner space 5.

Further, the oil path forming component 13 is installed in the enclosure main body 15 by press-fitting, for example. The on-vehicle oil sensor 1 is integrally formed with the enclosure main body 15, the terminal support 17, the detecting unit 9, the detecting unit platform 19, and the oil path forming component 13.

The on-vehicle oil sensor 1 is provided with an oil guide 25 made of, for example, an insulating resin such as synthetic resin. The oil guide 25 is provided at an opening 27 of the oil path 7 to introduce oil into the oil path 7. The oil path 7 provided with the oil guide 25 is at least a part of the oil paths 7A, 7B, and 7C.

As illustrated in, for example, FIG. 2, a portion (portion at least at the opening 27) 29 of the enclosure 3 where the plurality of oil paths 7 (7A, 7B, 7C) are formed is formed in a columnar shape. The columnar shape is, for example, a circular cylindrical shape.

For convenience of explanation, when a predetermined direction is defined as the height direction HD, each of the plurality of oil paths 7 (7A, 7B, 7C) extends in parallel to each other in the extending direction (height direction HD) of the central axis C1 of the columnar portion 29.

When viewed in the height direction HD, as illustrated in FIGS. 9A and 9B, each of the plurality of oil paths 7 (7A, 7B, 7C) or each of the openings 27 (27A, 27B, 27C) of the oil paths 7 is arranged at a position where the circumference of a circle (circle with a predetermined radius) centered on the central axis C1 of the columnar portion 29 is equally divided (see FIG. 9A).

When viewed in the height direction HD, each of the openings 27 of the plurality of oil paths (7A, 7B, 7C) is located on the side face of the columnar portion 29, and each of the plurality of oil paths 7 (7A, 7B, 7C) is located inside the plate-shaped portion 31. As illustrated in, for example, FIGS. 5A and 5B, the plate-shaped portion 31 is formed in, for example, a disk shape. The plate-shaped portion 31 forms the openings 27 of the plurality of oil paths 7 together with the columnar portion 29.

The plate-shaped portion 31 forms, for example, the oil guide 25 together with the partition 57. In other words, even if the oil passing through the opening 27A connected to the oil path 7A for introducing the oil into the enclosure inner space 5 hits against the partition 57 and splashes back, the splashed oil is prevented from moving to the lower side LW in FIG. 2 by the plate-shaped portion 31, and moves to the upper side UP in FIG. 2, making it easy to enter the enclosure inner space 5.

The on-vehicle oil sensor 1 will be described in more detail.

Figure 3A:
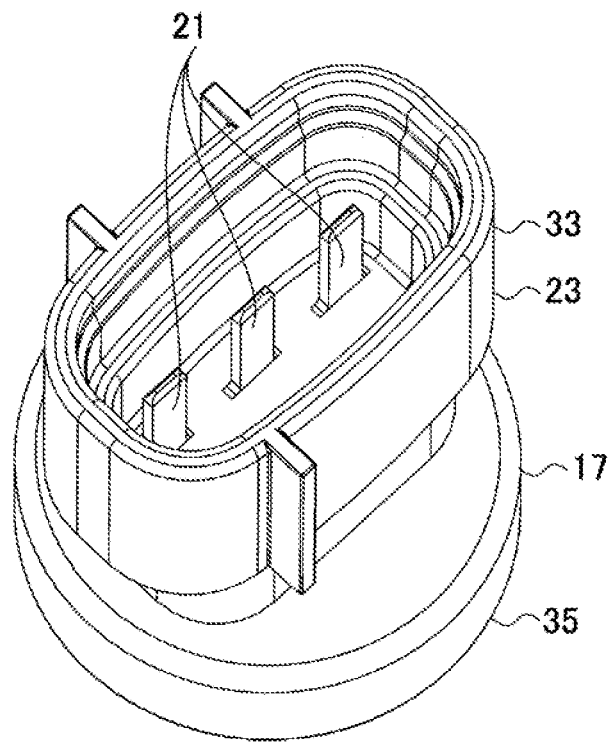
FIG. 3A is a perspective view of a terminal support, as viewed from the upper side UP, of the on-vehicle oil sensor according to the present embodiment.
Figure 3B:
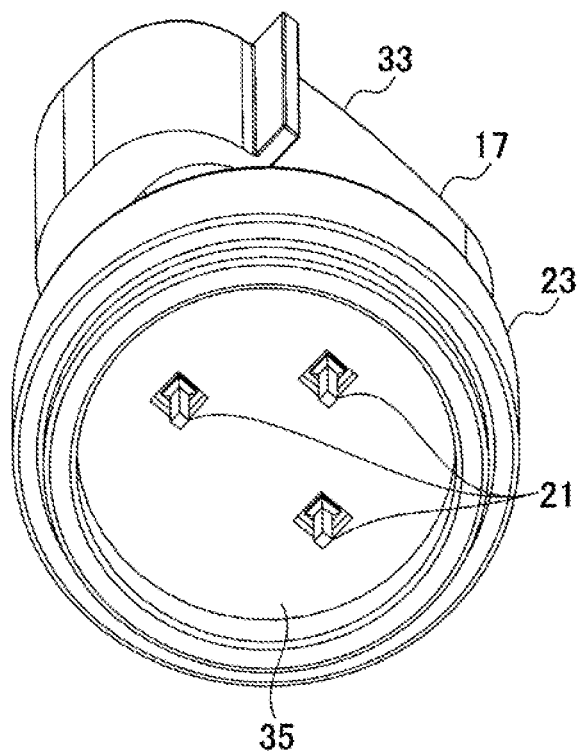
FIG. 3B is a perspective view of the terminal support, as viewed from the lower side LW, of the on-vehicle oil sensor according to the present embodiment.

As illustrated in, for example, FIGS. 3A and 3B, the terminal support 17 includes a connector receptacle 33 and an enclosure main body engaging portion 35. The connector receptacle 33 is configured to be connected to other connectors (not illustrated).

The enclosure main body engaging portion 35 is formed in a short cylindrical shape (cylindrical shape with the central axis extending in the height direction HD), is positioned on the lower side LW of the connector receptacle 33, and is engaged with the enclosure main body 15.

The terminal 21 protrudes upward from the resin 23 inside the cylindrical connector receptacle 33. The terminal 21 slightly protrudes downward from the resin 23 on the lower face of the enclosure main body engaging portion 35.

Figure 4A:
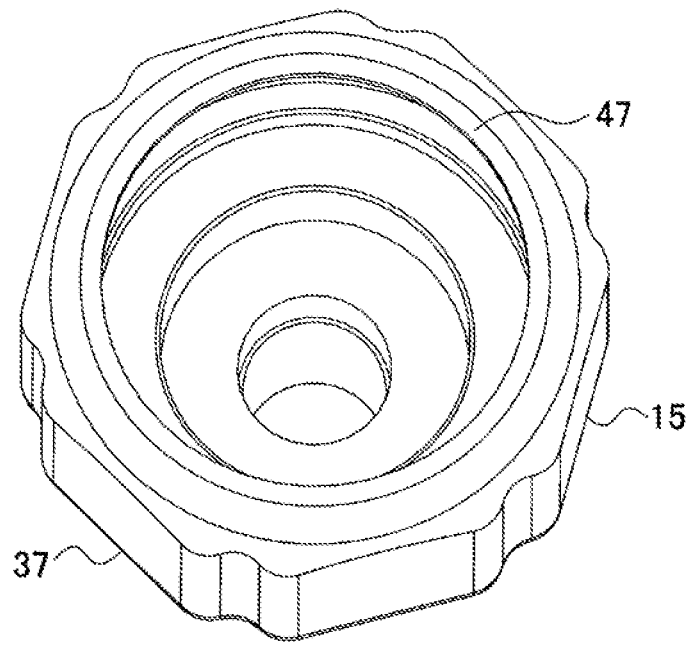
FIG. 4A is a perspective view of an enclosure main body, as viewed from the upper side UP, of the on-vehicle oil sensor according to the present embodiment.
Figure 4B:
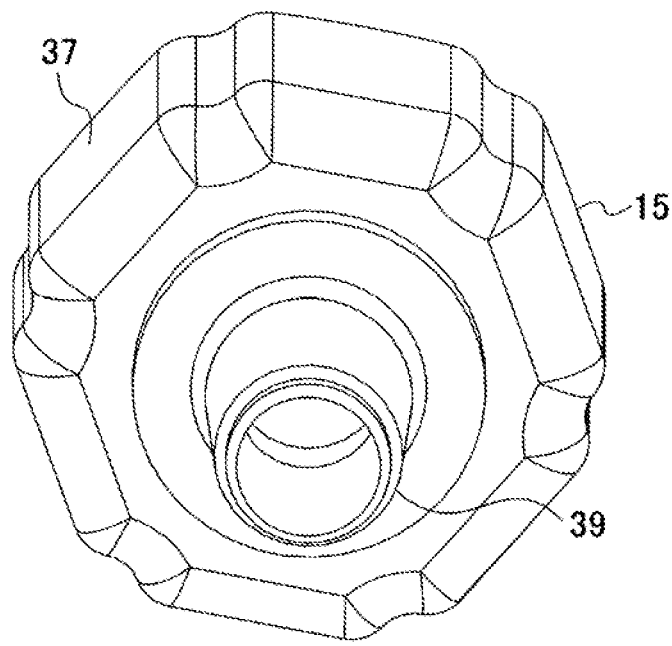
FIG. 4B is a perspective view of the enclosure main body, as viewed from the lower side LW, of the on-vehicle oil sensor according to the present embodiment.

As illustrated in, for example, FIGS. 4A and 4B, the enclosure main body 15 includes a terminal support engaging portion 37 and an oil path forming component engaging portion 39. The terminal support engaging portion 37 is formed in a short cylindrical shape having a cylindrical through-hole in the center thereof.

More specifically, the central axis of the terminal support engaging portion 37 extends in the height direction HD, and the cylindrical through-hole in the center is constituted by a large diameter portion 41, a medium diameter portion 43, and a small diameter portion 45. The central axis of the terminal support engaging portion 37, the central axis of the large diameter portion 41, the central axis of the medium diameter portion 43, and the central axis of the small diameter portion 45 coincide with each other. The large diameter portion 41, the medium diameter portion 43, and the small diameter portion 45 are arranged in this order from the top to the bottom.

The oil path forming component engaging portion 39 is formed in a cylindrical shape having a diameter smaller than that of the terminal support engaging portion 37, and is provided on the lower side LW of the terminal support engaging portion 37. The central axis C1 of the terminal support engaging portion 37 coincides with the central axis of the oil path forming component engaging portion 39.

A male screw (not illustrated) is formed on the outer peripheral face (side face) of the oil path forming component engaging portion 39. The male screw is a pipe screw and is used when the on-vehicle oil sensor 1 is installed in the cylinder block of the engine.

Further, a crimping portion 47 for holding the terminal support 17 is provided at the edge of the opening of the large diameter portion 41 of the terminal support engaging portion 37.

As illustrated in, for example, FIGS. 6A and 6B, the detecting unit platform 19 provided with the detecting unit 9 includes a flange-shaped portion 51 having an annular edge 49, and a cylindrical portion 53. The cylindrical portion 53 is provided with a flange-shaped portion 51, and the central axis of the flange-shaped portion 51 and the central axis of the cylindrical portion 53 extend in the height direction HD and coincide with each other.

As illustrated in FIG. 2, the enclosure main body 15, the detecting unit platform 19, and the terminal support 17 are integrated to form a space in the enclosure 3 by installing the detecting unit platform 19 provided with the detecting unit 9 in the enclosure main body 15, engaging the enclosure main body engaging portion 35 of the terminal support 17 in the enclosure main body 15, and crimping the crimping portion 47.

The inner space is partitioned into a space 65 on the upper side UP and a space (enclosure inner space) 5 on the lower side LW by a detecting unit platform 19 provided with a detecting unit 9. The space 65 on the upper side UP is opened to the atmosphere by an air path not illustrated, and in this case, the pressure (gauge pressure) of the oil entering the enclosure inner space 5 is measured by the detecting unit 9.

The space 65 on the upper side UP may be set to a vacuum state, and the pressure (absolute pressure) of the oil entering the enclosure inner space 5 may be measured by the detecting unit 9.

As illustrated in FIGS. 5A and 5B, the oil path forming component 13 includes a forming component main body 55, a partition 57, a disk-shaped portion (plate-shaped portion) 31, and a forming component flange portion 61. The forming component main body 55 is formed in a cylindrical shape having the central axis C1 extending in the height direction HD. As illustrated in FIGS. 9A and 9B, the partition 57 is formed in a "Y" shape when viewed in the height direction HD.

The partition 57 enters the forming component main body 55. Thus, the inside of the cylindrical forming component main body 55 is divided into three portions forming three oil paths 7A, 78, and 7C extending in the height direction HD in parallel to each other.

When viewed in the height direction HD, each of the three plurality of oil paths 7 (7A, 7B, 7C) is arranged at a position where the circumference of a circle (circle with a predetermined radius) centered on the central axis of the columnar portion 29 is equally divided.

The size of the partition 57 in the height direction HD is larger than the size of the forming component main body 55 in the height direction HD. In the height direction HD, the upper end of the forming component main body 55 and the upper end of the partition 57 coincide with each other, and the lower end of the partition 57 protrudes from the lower end of the forming component main body 55 toward the lower side LW.

The outer diameter of the disk-shaped portion 31 coincides with the outer diameter of the forming component main body 55, and the disk-shaped portion 31 is provided at the lower end of the partition 57 so that the thickness direction of the disk-shaped portion 31 coincides with the height direction HD. When viewed in the height direction HD, the center of the forming component main body 55, the center of the partition 57, and the center of the disk-shaped portion 31 coincide with each other.

Thus, when viewed in the height direction HD, each of the openings 27 of the three oil paths 7A, 7B, and 7C is located at the side face of the columnar portions 29. Each of the plurality of oil paths 7 (7A, 7B, 7C) is located inside the plate-shaped portion (disk-shaped portion whose thickness direction is the height direction HD) 31 at the lower end of the on-vehicle oil sensor 1 (see FIGS. 9A and 9B). The opening 27 is located between the forming component main body 55 and the plate-shaped portion 31 in the height direction HD.

The outer diameter of the forming component flange portion 61 is larger than the outer diameter of the forming component main body 55, and the forming component flange portion 61 is positioned in the middle of the forming component main body 55 in the height direction HD.

The forming component flange portion 61 serves as a stopper when the upper end (portion on the upper side UP of the forming component main body 55 above the forming component flange portion 61) of the oil path forming component 13 is pressed into the oil path forming component engaging portion 39 of the enclosure main body 15.

The operation of the on-vehicle oil sensor 1 will now be described.

In the initial state, the on-vehicle oil sensor 1 is installed in the cylinder block of the engine, and the opening 27 of the on-vehicle oil sensor 1 is positioned in the oil flow passage of the cylinder block of the engine.

When the on-vehicle oil sensor 1 is installed in the cylinder block of the engine, the enclosure main body component 11 (oil path forming component engaging portion 39) of the on-vehicle oil sensor 1 is installed in contact with the cylinder block of the engine, and the oil guide 25 (oil path forming component 13) is separated from the cylinder block of the engine and positioned in the oil flow passage of the cylinder block of the engine.

When the engine is operated in this initial state, an oil flow (flow perpendicular to the height direction HD) as indicated by the arrow in FIG. 9A is generated. A part of this oil flow enters the oil path 7A from the one opening 27A, flows in the oil path 7A to the enclosure inner space 5, then flows in the two oil paths 7B and 7C, and exits to the oil flow passage of the cylinder block of the engine from the openings 27B and 27C.

The detecting unit 9 measures the pressure and temperature of the oil in the enclosure inner space 5. When the detecting unit 9 detects the pressure of the oil in the enclosure inner space 5, the detecting unit 9 may detect the total pressure (static pressure and dynamic pressure) of the oil because there is a flow of the oil in the enclosure inner space 5. Therefore, when the static pressure is to be detected, the detected total pressure may be appropriately corrected. For example, the above described correction may be performed by obtaining the dynamic pressure in accordance with the rotational speed of the engine.

In FIG. 9A, the one oil path 7A (opening 27A) is just opposed to the flow direction of the oil indicated by the arrow. However, since the on-vehicle oil sensor 1 is installed in the cylinder block of the engine with a pipe screw, the rotation angle around the central axis C1 is not constant.

For example, as illustrated in FIG. 9B, the two oil paths 7A (opening 27A) and 7C (opening 27C) are opposed to the flow direction of the oil indicated by the arrow. Even in this case, a flow of oil is generated in the enclosure inner space 5, and the oil is circulated in the enclosure inner space 5.

In other words, in the embodiment illustrated in FIG. 9B, a part of the oil flowing in the oil flow passage of the cylinder block of the engine enters the oil paths 7A and 7C from the two openings 27A and 27C, flows in the oil paths 7A and 7C to the enclosure inner space 5, then flows in the one oil path 7B and exits to the oil flow passage of the cylinder block of the engine from the opening 27B.

The on-vehicle oil sensor 1 is provided with the plurality of oil paths 7 for connecting the outside of the enclosure 3 and the enclosure inner space 5, and the detecting unit 9 is configured to detect the pressure of oil in the enclosure inner space 5 or the temperature of oil in the enclosure inner space 5 and thus being good productivity and enabling to accurately measure the temperature and the pressure of oil.

Figure 12:
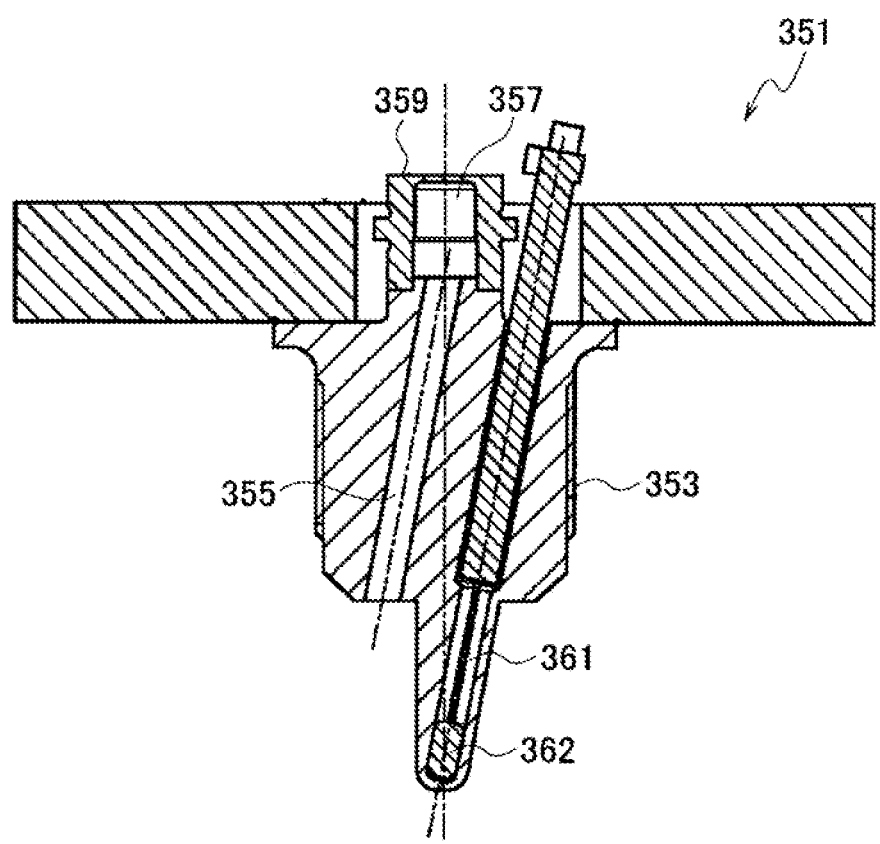
FIG. 12 is a drawing illustrating a conventional oil sensor.

In other words, in the present embodiment, since the detecting unit 9 is only required to be installed in the enclosure inner space 5, the detecting unit 9 can be easily installed without the need to install a temperature sensor 362 in an elongated hole 361 as in the conventional oil sensor 351 illustrated in FIG. 12. Therefore, the on-vehicle oil sensor 1 improves productivity. Further, the plurality of oil paths 7 generate a flow of oil in the oil path 7 and the enclosure inner space 5 and circulate the oil in the enclosure inner space 5. Thus, the temperature and pressure in the enclosure inner space 5 can be accurately measured. The occurrence of oil flow can prevent clogging in the oil path.

In the on-vehicle oil sensor 1, the enclosure 3 includes the enclosure main body component 11, and the oil path forming component 13 forming the plurality of oil paths 7, and thus the plurality of oil paths 7 can be easily formed even if the structure of the enclosure main body component 11 is simplified.

Further, in the on-vehicle oil sensor 1, the oil guide 25 is provided at the opening 27 of the oil path 7, and thus the flow of oil in the oil path 7 can be generated more reliably, and the temperature and pressure of oil can be measured more accurately.

In addition, in the on-vehicle oil sensor 1, when the on-vehicle oil sensor 1 is mounted on a mounting member, for example, a cylinder block of an engine made of metal, even if the oil guide 25 is accidentally hit against the mounting member, the impact force generated at this time can be absorbed by the elastic deformation of the resin and can be reduced, because of the oil guide 25 made of resin.

Figure 13:
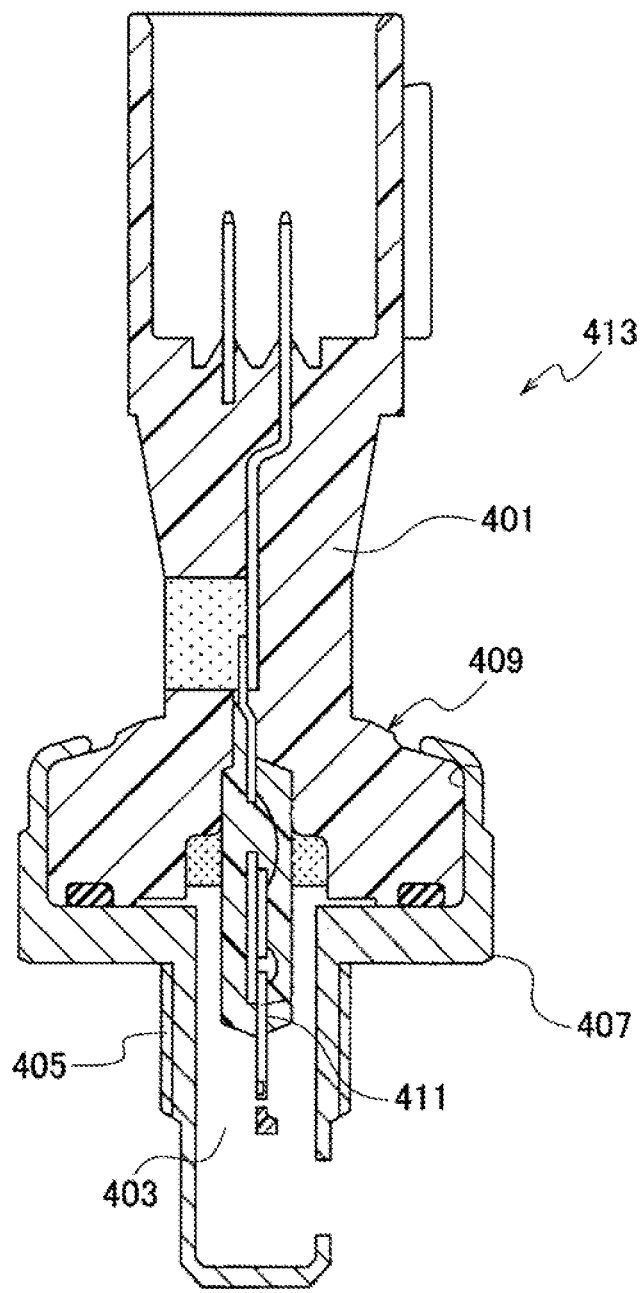
FIG. 13 is a drawing illustrating a conventional oil sensor.

On the other hand, in an oil sensor 401 disclosed in JP 6358154 B2 illustrated in FIG. 13, the second case 407 is made of metal, and thus if the second case 407 is accidentally hit against the cylinder block of the engine made of metal when the oil sensor 401 is mounted on the cylinder block of the engine, the impact force at this time is increased.

Further, since the oil guide 25 is made of a resin having a lower heat transfer coefficient than a metal, heat transfer between the oil and the cylinder block of the engine becomes difficult, for example, and the temperature of the oil can be detected more accurately.

On the other hand, in the oil sensor 401 disclosed in JP 6358154 B2, since the second case 407 in which the oil introduction hole 403 is formed is made of metal, heat is easily transferred between the oil and the cylinder block, and the temperature of the oil may not be accurately detected.

In the on-vehicle oil sensor 1, a portion 29 of the enclosure 3 in which the plurality of oil paths 7 are formed is formed in a columnar shape, and each of the plurality of oil paths 7 extends in parallel to each other in the extending direction of the central axis C1 of the columnar portion 29. When viewed in the extending direction of the central axis C1 of the columnar portion 29, each of the plurality of oil paths 7 is arranged at a position where the circumference of a circle centered on the central axis C1 of the columnar portion 29 is equally divided. Further, each of the openings 27 of the plurality of oil paths 7 is located at a side face of the columnar portion 29, and each of the plurality of oil paths 7 is located inside the plate-shaped portion (cylindrical portion) 31. Thus, even if the flow direction of the oil flowing through the oil flow passage formed in the cylinder block of the engine is orthogonal to the direction in which the oil path 7 extends, the flow of the oil in the oil path 7 of the on-vehicle oil sensor 1 can be reliably generated.

Figure 8A:
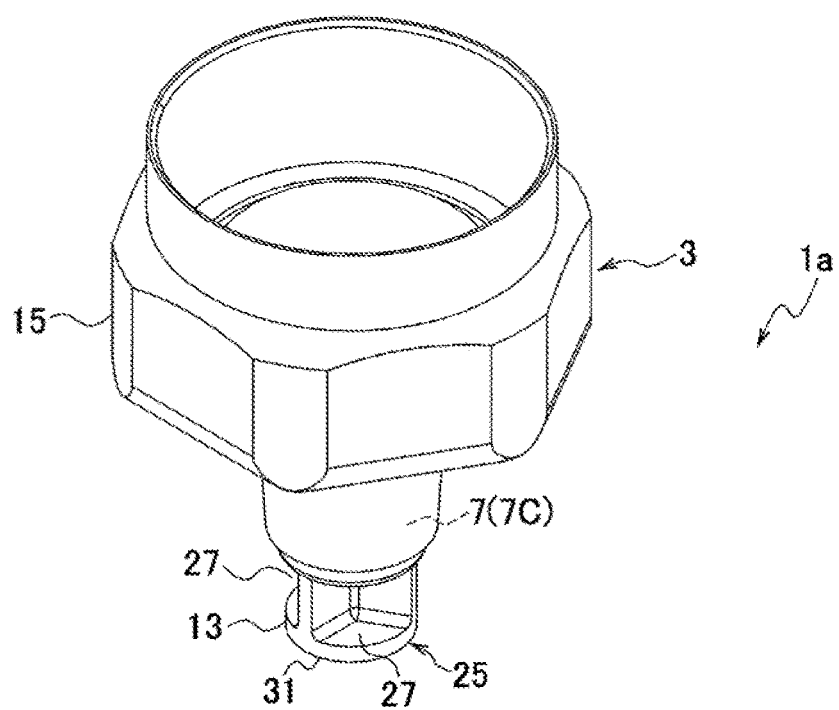
FIG. 8A is a perspective view of the enclosure main body, as viewed from the upper side UP, of the on-vehicle oil sensor according to another modification.
Figure 8B:
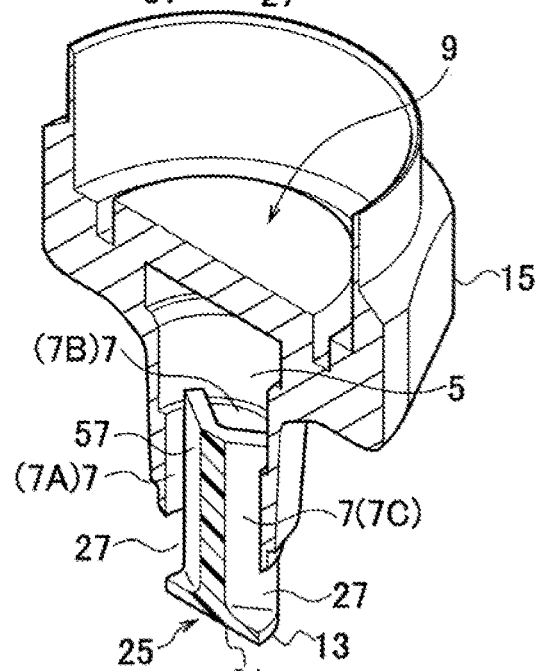
FIG. 8B is a perspective view of a partial cross section of the enclosure main body of the on-vehicle oil sensor illustrated in FIG. 8A.
Figure 8C:
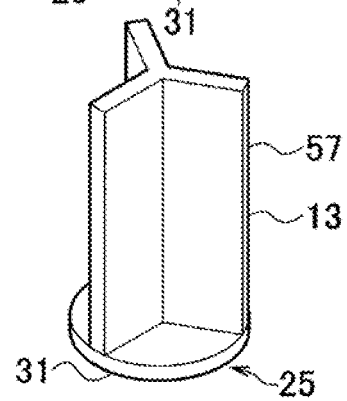
FIG. 8C is a perspective view of an oil path forming component of the on-vehicle oil sensor illustrated in FIG. 8A.

An on-vehicle oil sensor 1a according to a modification will now be described with reference to FIGS. 8A to 8C. In FIGS. 8A to 8C, the shape of the oil path forming component 13 is different from that of the on-vehicle oil sensor 1 illustrated in, for example, FIG. 1, and the other respects are the same as those of the on-vehicle oil sensor 1 illustrated in, for example, FIG. 1.

In other words, in the on-vehicle oil sensor 1 illustrated in, for example, FIG. 1, the oil path forming component 13 is configured as illustrated in FIG. 8C. The oil path forming component 13 illustrated in FIG. 8C has a configuration in which the cylindrical forming component main body 55 is eliminated from the oil path forming component 13 illustrated in FIGS. 5A and 5B.

The oil path forming component 13 illustrated in FIG. 8C is pressed into the oil path forming component engaging portion 39 of the enclosure main body 15 to form the plurality of oil paths 7. Thus, the oil path forming component 13 forms the plurality of oil paths 7 (7A, 7B, 7C) together with the enclosure main body component 11 (enclosure main body 15).

The enclosure main body 15 and the oil path forming component 13 may be integrally formed.

Another modification will now be described with reference to FIGS. 7A, 7B, 9C, and 9D.

Figure 7A:
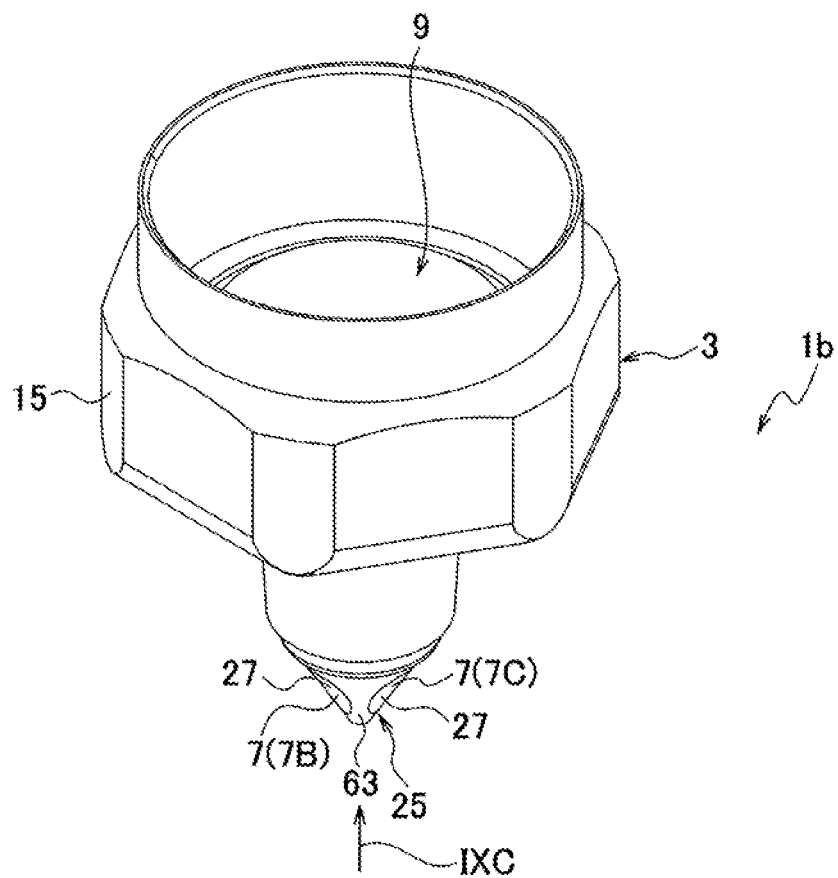
FIG. 7A is a perspective view of an enclosure main body, as viewed from the upper side UP, of an on-vehicle oil sensor according to the modification.
Figure 7B:
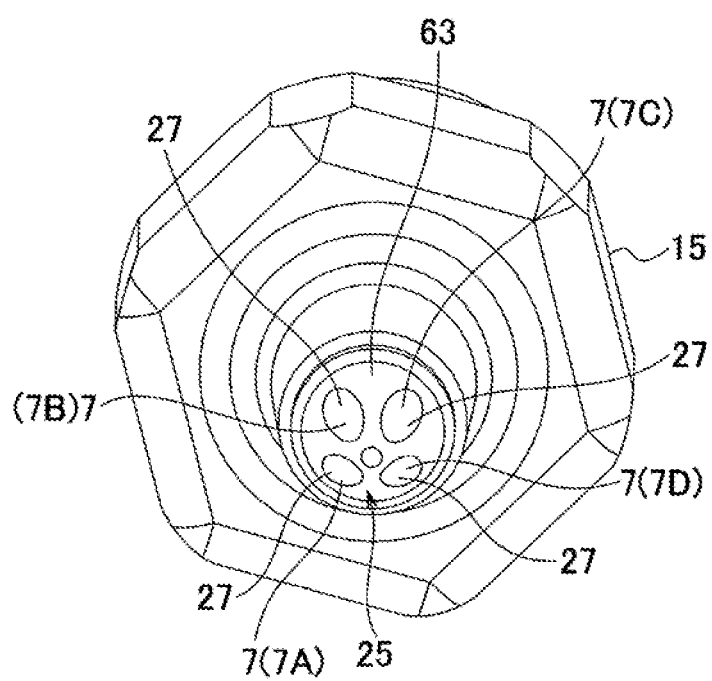
FIG. 7B is a perspective view of the enclosure main body, as viewed from the lower side LW, of the on-vehicle oil sensor according to the modification.

The on-vehicle oil sensor 1b illustrated in FIGS. 7A and 7B differs from the on-vehicle oil sensor 1 illustrated in, for example, FIG. 1 in that the enclosure main body 15 and the oil path forming component 13 are integrally formed. Further, the shape of the opening of the oil path 7 is different from that of the on-vehicle oil sensor 1 illustrated in, for example, FIG. 1. The other respects are the same as those of the on-vehicle oil sensor 1 illustrated in, for example, FIG. 1.

In other words, in the on-vehicle oil sensor 1b illustrated in, for example, FIGS. 7A and 7B, a portion 63 of the enclosure 3 at the openings 27 of the plurality of oil paths 7 is formed in a cone shape (for example, a conical shape). The portion 63 of the enclosure 3 at the openings 27 of the plurality of oil paths 7 may also be formed in a frustum shape (for example, a truncated cone shape).

Further, in the on-vehicle oil sensor 1b illustrated in, for example, FIGS. 7A and 7B, each of the plurality of oil paths 7 extends in parallel to each other in the extending direction (height direction HD) of the central axis C1 of the cone or frustum, and the plurality of oil paths 7 are opened on the side face (slope) of the portion 63 formed in a cone or frustum shape.

Further, when viewed in the extending direction (height direction HD) of the central axis C1 of the cone or frustum, each of the plurality of oil paths 7 is arranged at a position where the circumference of a circle (circle with a predetermined radius) centered on the central axis of the cone or frustum is equally divided.

Figure 9C:
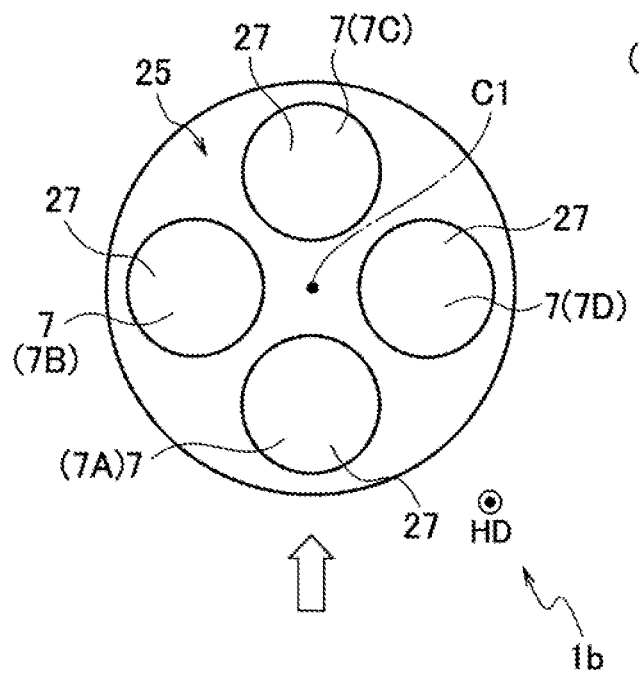
FIG. 9C is a view taken in the direction of the arrow IXC in FIG. 7A, illustrating the flow direction of the oil in the oil flow passage formed in the cylinder block of the engine.

In the on-vehicle oil sensor 1b, when oil flows through the oil flow passage formed in the cylinder block of the engine as indicated by the arrow in FIG. 9C, oil enters the enclosure inner space 5 mainly through the one oil path 7A, and oil flows out of the enclosure inner space 5 mainly through the one oil path 7C.

Figure 9D:
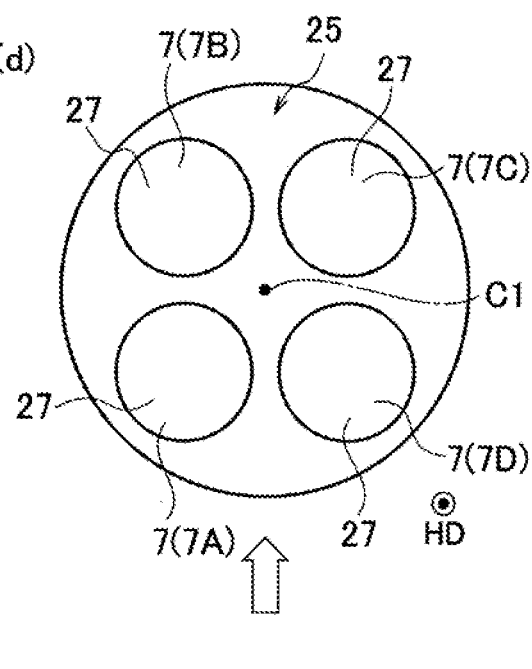
FIG. 9D is a view of the changed flow direction of the oil in the oil flow passage formed in the cylinder block of the engine in FIG. 9C.

Further, in the on-vehicle oil sensor 1b, when oil flows through the oil flow passage formed in the cylinder block of the engine as indicated by the arrow in FIG. 9D, oil enters the enclosure inner space 5 through the two oil paths 7A and 7D, and oil flows out of the enclosure inner space 5 through the two oil paths 78 and 7C.

Even in the on-vehicle oil sensor 1b, the oil guide 25 is formed by the openings 27 of the plurality of oil paths 7 and the conical portion 63. In other words, since the opening 27 connected to the oil path 7A for introducing the oil into the enclosure inner space 5 is formed on the slope of the conical portion 63, the oil flowing and colliding with the slope of the conical portion 63 easily enters the oil path 7A from the opening 27 connected to the oil path 7A.

In the on-vehicle oil sensor 1b, the conical portion 63 and the portion constituting the oil path 7 may also be made of resin. When the on-vehicle oil sensor 1b is installed in the cylinder block of the engine, the conical portion 63 and the portion constituting the oil path 7 may be separated from the cylinder block of the engine and positioned in the oil flow passage of the cylinder block of the engine.

In the on-vehicle oil sensor 1b, the portion 63 of the enclosure 3 at the openings 27 of the plurality of oil paths 2 is formed in the shape of a cone or a frustum, and each of the plurality of oil paths 7 extends in parallel to each other in the extending direction of the central axis C1 of the cone or frustum. The plurality of oil paths 7 are opened on the side faces of the cone or the frustum, and each of the plurality of oil paths is arranged at a position where the circumference of a circle centered on the central axis of the cone or the frustum is equally divided when viewed in the extending direction of the central axis C1 of the cone or the frustum. Thus, even if the flow direction of the oil flowing through the oil flow passage formed in the cylinder block of the engine is orthogonal to the direction in which the oil path 7 extends, the flow of the oil in the oil path 7 of the on-vehicle oil sensor 1b can be reliably generated.

The shape of the oil path forming component 13 may be changed, for example, as follows. The oil path forming component 13 may be formed into a plurality of (for example, two) male screw shapes (stud bolt shapes of full thread). A plurality of (for example, two (two columns)) spiral oil paths 7 may be formed by screwing a portion on the upper side UP of the oil path forming component 13 into the oil path forming component engaging portion 39 of the enclosure main body 15, and thus the oil flow in the oil path 7 and the enclosure inner space 5 may be formed.

In this case, for example, the inner diameter of the cylindrical oil path forming component engaging portion 39 is slightly smaller than the ridge diameter of the male screw of the oil path forming component 13, or the inner diameter of the cylindrical oil path forming component engaging portion 39 is equal to the ridge diameter of the male screw of the oil path forming component 13, and the inner diameter of the cylindrical oil path forming component engaging portion 39 is larger than the root diameter of the male screw of the oil path forming component 13.

Figure 11A:
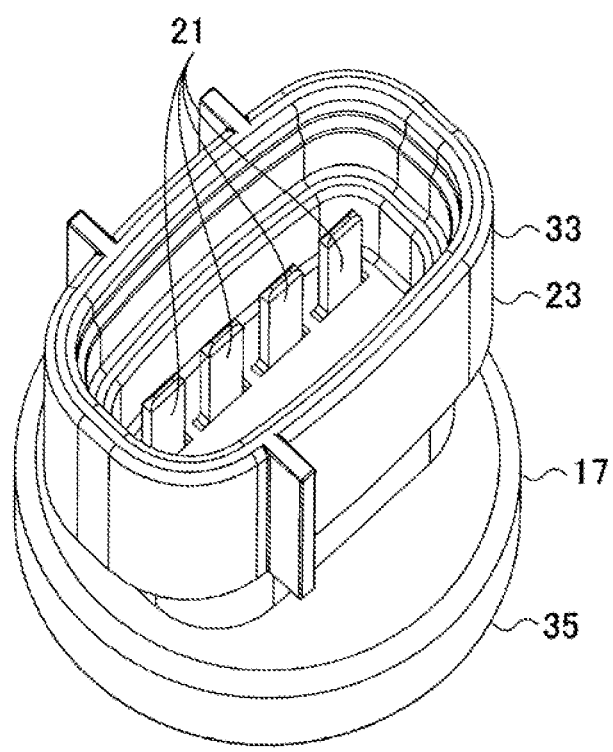
FIG. 11A is a view of a terminal support, as viewed from the upper side UP, of the on-vehicle oil sensor according to the modification.
Figure 11B:
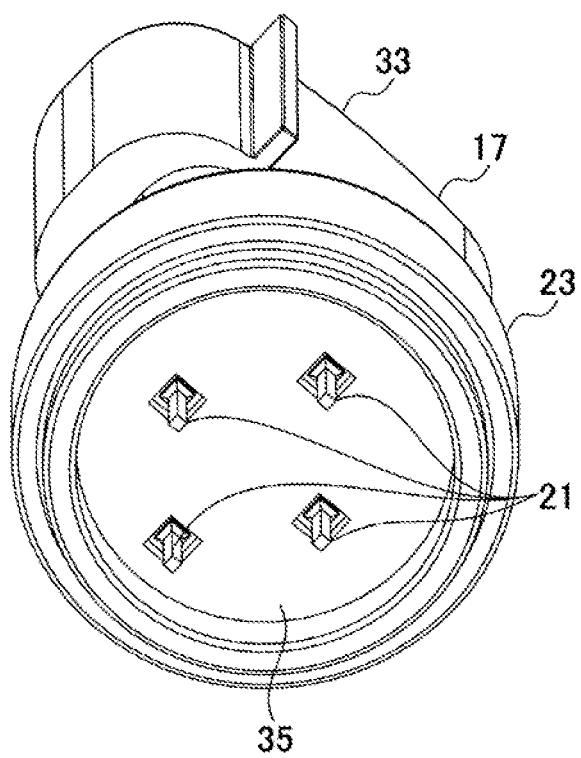
FIG. 11B is a perspective view of the terminal support, as viewed from the lower side LW, of the on-vehicle oil sensor according to the modification.

Although three terminals 21 are provided in FIGS. 3A and 3B, four terminals 21 may be provided as illustrated in FIGS. 11A and 11B. Further, five or more terminals 21 may be provided, or only two terminals may be provided.

Figure 10:
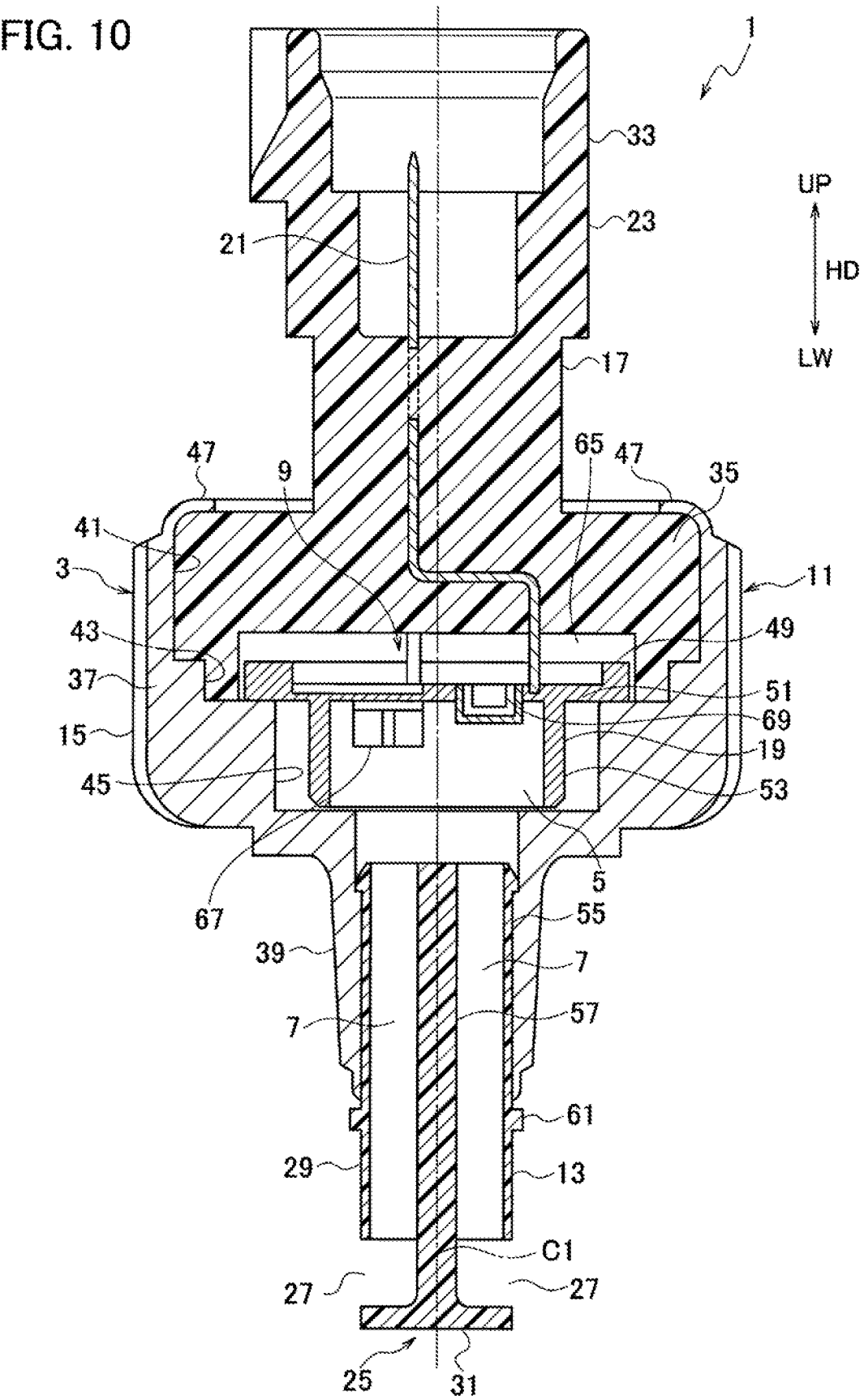
FIG. 10 is a view corresponding to FIG. 2, illustrating an on-vehicle oil sensor in which a pressure sensor and a temperature sensor are depicted.

As illustrated in FIG. 10, the detecting unit 9 may be constituted of a pressure sensor 67 and a temperature sensor 69. Further, in the embodiment illustrated in FIG. 10, the installation positions of the pressure sensor 67 and the temperature sensor 69 may be interchanged.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An on-vehicle oil sensor comprising:
an enclosure including: an enclosure main body component having an enclosure inner space provided therein and configured to allow oil to enter the enclosure inner space; and an oil path forming component having a plurality of oil paths communicating with the enclosure inner space and connecting an exterior of the enclosure to the enclosure inner space, the enclosure main body component and the oil path forming component extending in an axial direction and the plurality of oil paths extending in said axial direction; and
a detecting unit provided in the enclosure inner space and configured to detect at least one of pressure of oil in the enclosure inner space and temperature of oil in the enclosure inner space,
wherein when the on-vehicle oil sensor is installed in a mounting member having oil flowing therein, the oil flows across the oil path forming component in a direction perpendicular to the axial direction, flows along at least one of the plurality of oil paths in said axial direction into said enclosure inner space and then exits through at least one of the other plurality of oil paths.

2. The on-vehicle oil sensor according to claim 1, wherein each of the plurality of oil paths has an oil guide formed at an opening and configured to introduce oil into each of the plurality of oil paths.

3. The on-vehicle oil sensor according to claim 2, wherein the oil guide is made of resin.

4. An on-vehicle oil sensor comprising:
an enclosure including: an enclosure inner space provided inside the enclosure and configured to allow oil to enter the enclosure inner space; and a plurality of oil paths provided in the enclosure and connecting an exterior of the enclosure to the enclosure inner space; and
a detecting unit configured to detect at least one of pressure of oil in the enclosure inner space and temperature of oil in the enclosure inner space, wherein
a portion of the enclosure where the plurality of oil paths are formed is a columnar portion,
each of the plurality of oil paths extends in parallel to each other in an extending direction of a central axis of the columnar portion,
when viewed in the extending direction of the central axis of the columnar portion, each of the plurality of oil paths is arranged at a position where a circumference of a circle centered on the central axis of the columnar portion is equally divided,
an opening of each of the plurality of oil paths is located on a side face of the columnar portion, and
each of the plurality of oil paths is located inside a plate-shaped portion forming the opening of each of the plurality of oil paths together with the columnar portion.

5. An on-vehicle oil sensor comprising:
an enclosure including: an enclosure inner space provided inside the enclosure and configured to allow oil to enter the enclosure inner space; and a plurality of oil paths provided in the enclosure and connecting an exterior of the enclosure to the enclosure inner space; and
a detecting unit configured to detect at least one of pressure of oil in the enclosure inner space and temperature of oil in the enclosure inner space, wherein
a portion of the enclosure at openings of the plurality of oil paths is formed in a shape of a cone or a frustum,
each of the plurality of oil paths extends in parallel to each other in the extending direction of the central axis of the cone or frustum,
the plurality of oil paths are opened on the side face of the cone or frustum, and
when viewed in the extending direction of the central axis of the cone or frustum, each of the plurality of oil paths is arranged at a position where a circumference of a circle centered on the central axis of the cone or frustum is equally divided.

* * * * *